United States Patent [19]

Anderle et al.

[11] 4,089,505
[45] May 16, 1978

[54] OSCILLATING SLIDE VALVE

[75] Inventors: Fritz Anderle, Hanau; Gerhard Frey, Munich; Lutz Grein, Hanua; Uwe Reimpell, Hanau; Friedrich Stark, Hanua, all of Germany

[73] Assignee: Leybold-Heraeus GmbH & Co. Kommandit-Gesellschaft, Cologne, Germany

[21] Appl. No.: 740,031

[22] Filed: Nov. 8, 1976

[30] Foreign Application Priority Data

Nov. 8, 1975 Germany ............................. 2550203

[51] Int. Cl.² ............................................. F16K 31/02
[52] U.S. Cl. .................................... 251/133; 251/158; 251/193
[58] Field of Search ............... 251/160, 161, 162, 163, 251/193, 188, 158, 133

[56] References Cited

U.S. PATENT DOCUMENTS

| 241,568 | 5/1881 | Spratt | 251/158 X |
| 966,713 | 8/1910 | Snow | 251/158 |
| 989,202 | 4/1911 | Snow | 251/158 |
| 3,237,916 | 3/1966 | Bryant | 251/158 |
| 3,904,171 | 9/1975 | Chrouister | 251/162 X |

FOREIGN PATENT DOCUMENTS 232,425  8/1944  Switzerland ........................ 251/161

Primary Examiner—Harold W. Weakley
Attorney, Agent, or Firm—Spencer & Kaye

[57] ABSTRACT

In an oscillating valve in which a slide plate is subjected to a swinging movement between an opening position in which it is clear of a flow passage and a closing position in which it is inserted in the flow path, and, in its closing position, is applied against a sealing surface by a sealing force to block the flow path, a single drive device is provided to produce both the swinging movement and the sealing force and the sealing force is produced by moving the slide plate perpendicular to the sealing surface only after the slide plate has reached the closing position associated with its swinging movement.

12 Claims, 3 Drawing Figures

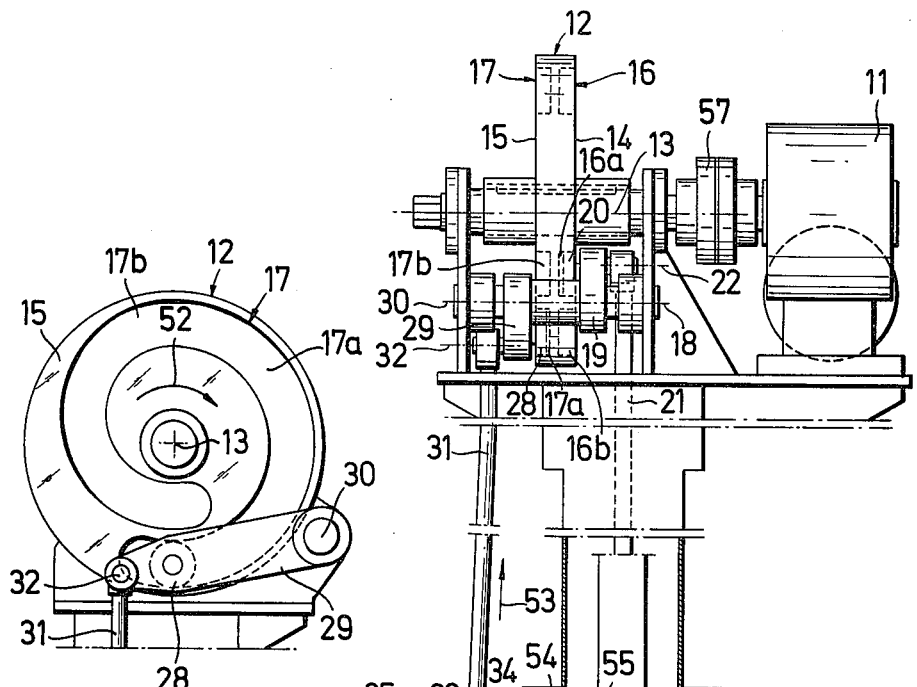
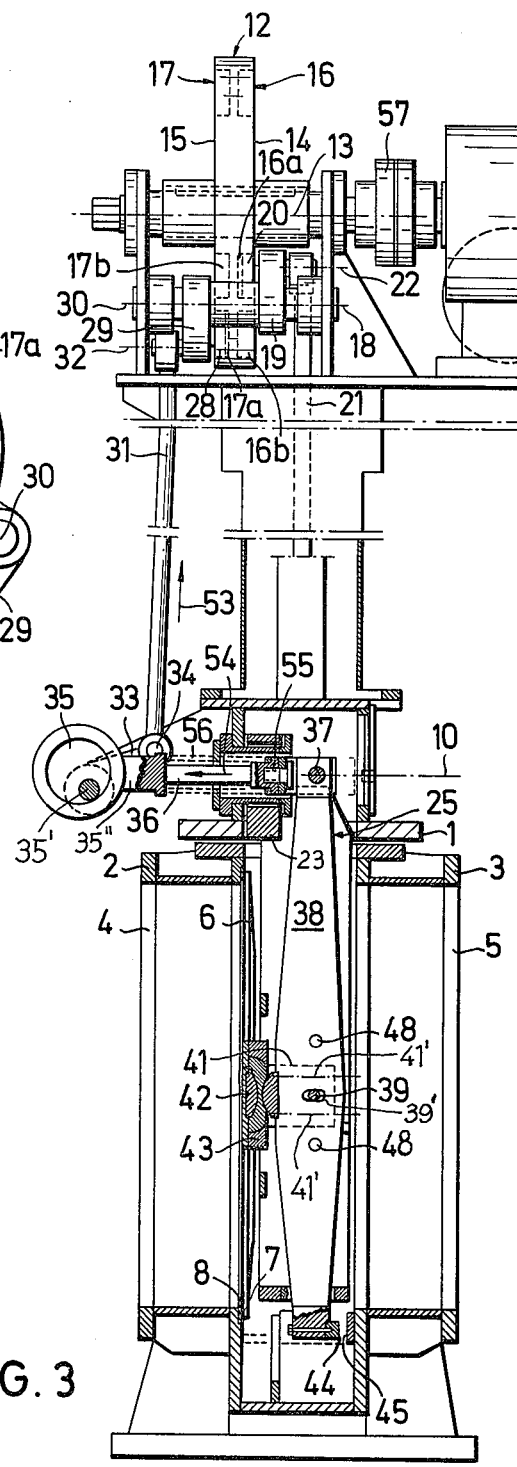
FIG. 2
FIG. 3

OSCILLATING SLIDE VALVE

BACKGROUND OF THE INVENTION

The present invention relates to an oscillating slide valve of the type provided with a slide plate, a drive device for subjecting the slide plate to an oscillating movement between a valve closing position and a valve opening position, and a mechanism for generating a sealing force in the closing position of the slide plate.

In existing oscillating slide valves, the slide plate undergoes a swinging oscillating movement resembling that of a pendulum during the acutation of the valve, which movement brings the slide plate from the opening position into the closing position, or vice versa. Furthermore, care must be taken that the slide plate, in the closed state of the valve, is pressed against the surface to be sealed so as to generate the necessary sealing force.

In known slide valves the pendulum-like movement is produced, for example, by a motor drive. The sealing force can be generated, for example, by guiding the slide plate along a plane which is inclined with respect to the sealing plane. Thus the last part of the closing movement or the first part of the opening movement, respectively, of the slide plate is not perpendicular, but rather at a relatively acute angle, to the plane at which a seal is to be produced.

This type of movement can be detrimental to the sealing effect as well as to the sealing surfaces since mutual friction cannot be avoided.

Another possible approach is to generate the sealing force, once the slide plate has stopped in its closing position, pneumatically or, for very large oscillating slide valves, by means of a second motor drive, These possibilities create technical complications and lead to a considerable increase in the cost of the oscillating slide valves.

SUMMARY OF THE INVENTION

It is an object of the present invention to eliminate the drawbacks of prior solutions to the problem of applying a sealing force to the slide plate.

A more specific object of the present invention is to provide, in an oscillating slide valve including a slide plate and a drive device for generating the pendulum movement of the slide plate between its valve closing position and its valve opening position, a novel system for generating a sealing force in the closed position of the valve which does not have the above-described drawbacks. In particular, a slide valve according to the invention is suitable for relatively large standard diameters.

These and other objects are achieved, according to the invention, in an oscillating slide valve including a slide plate, a drive device for operating the slide plate, a fluid flow passage and a planar sealing surface surrounding the passage, a mechanism connected between the drive device and the slide plate for moving the slide plate, in response to movement of the drive device, between a valve opening position in which the slide plate is displaced laterally from the fluid passage and a valve closing position in which the slide plate is interposed in the flow passage, and a second mechanism for pressing the slide plate against the sealing surface when the plate is in its closing position, by connecting the second mechanism so that it is driven by the drive device and moves the slide plate perpendicular to the sealing surface and against the sealing surface only after the slide plate has come to rest in its closing position.

In order to control the different movements, the drive device preferably includes a single drive motor and a control cam connected to be rotated by the drive motor and having grooves on both sides. One portion of each groove is concentric to the axis of cam rotation and another portion thereof has an approximately spiral shape. In such an oscillating slide valve, a second drive device for generating the sealing pressure is eliminated. Depending on the type or configuration of the grooves in the cam disc, it is possible to generate extremely large forces so that an oscillating slide valve according to the invention is particularly well suited for large standard diameters and/or high pressure differentials.

BRIEF DESCRIPTION OF THE DRAWINGS

FIG. 2 is an elevational detail view of the rear of an element of the structure shown in FIG. 1.

FIG. 3 is a partly cross-sectional view of the same embodiment, in a plane perpendicular to the plane to be sealed.

DESCRIPTION OF THE PREFERRED EMBODIMENTS

Figure 1:
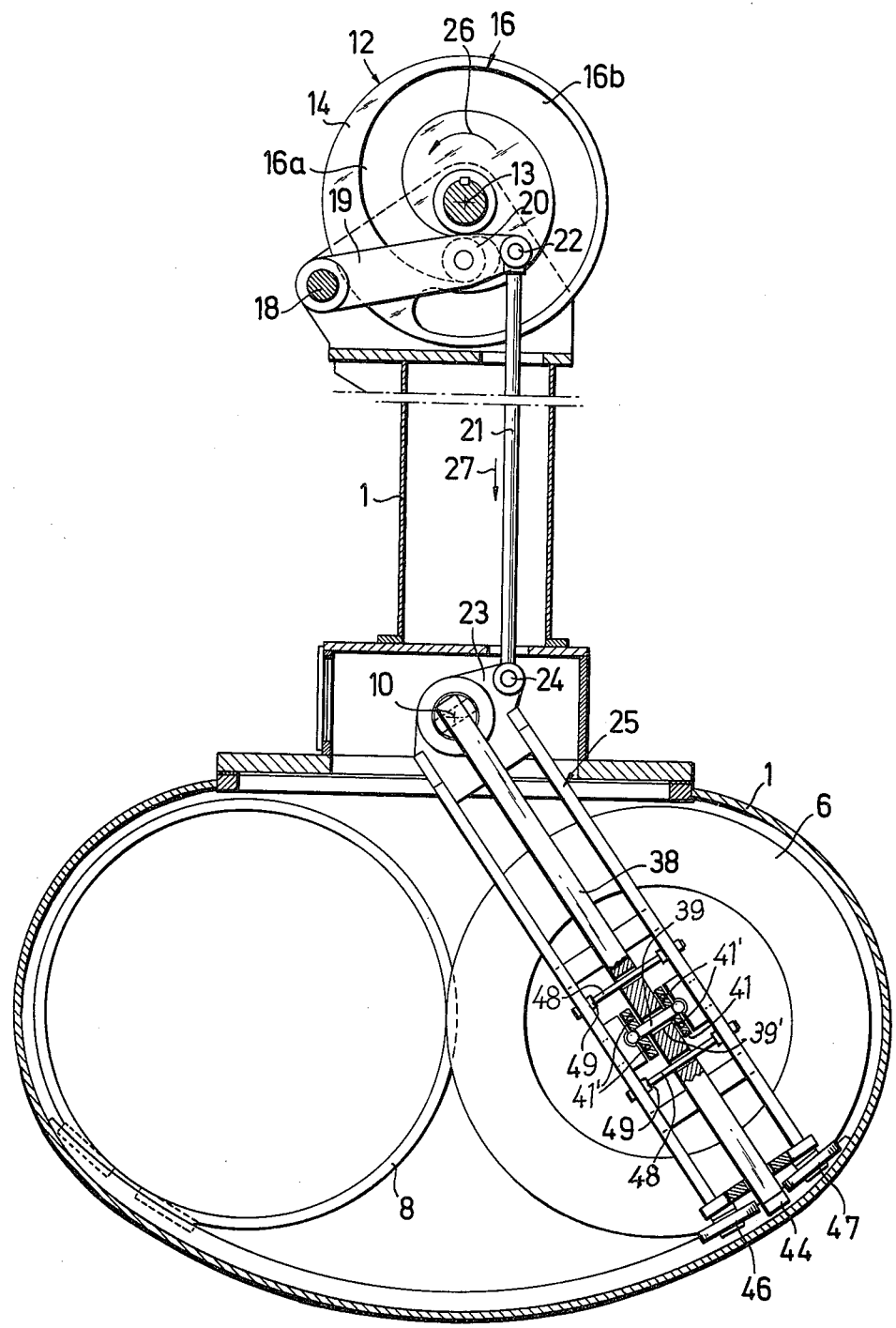
FIG. 1 is a partly cross-sectional elevational view, parallel to the plane to be sealed, of a preferred embodiment of a slide valve according to the invention.

Referring to FIGS. 1 and 3 together, there is shown a valve assembly including a housing 1 to which flanges 2 and 3 are fastened to provide for connection of openings 4 and 5 in the housing to, for example, a vacuum vessel and a vacuum pump, respectively. A slide plate 6 is disposed in housing 6 and can be moved into a valve closing position in which it seals the two openings 4 and 5 from one another. Plate 6 is provided with an annular seal, or gasket, 7 which in the closed position of the valve rests against a surface 8 to be sealed.

In order to bring the slide plate 6, which in FIG. 1 is shown in its open position, into the closed position, it is initially necessary to generate a pendulum-like swinging movement which in the present case takes place about axis 10. Furthermore, the necessary sealing force must be generated to move the slide plate 6, in its valve closing position, toward the sealing surface 8 and to press seal 7 against that surface.

In accordance with the invention, only one drive motor 11 is provided to generate both the swinging movement and the sealing force. This drive motor 11 is connected to rotate a control cam disc 12 about axis 13. This cam disc 12 serves the purpose of transmitting the forces generated by drive motor 11 in the desired manner, i.e., to produce the pendulum-like swinging movement of slide plate 6 as well as to generate the sealing force. For this purpose cam 12 is provided with grooves 16 and 17, each groove being provided at a respective one of the opposite sides 14 and 15 of the disc 12. These grooves are given selected configurations for producing the desired movements.

Groove 16 on side 14 of the control cam disc 12 serves to control the pendulum-like movement of slide plate 6 about axis 10. In order to do this, there is provided a pivot lever 19 mounted at one end to pivot about a fixed axis 18 supported by housing 1. Lever 19 is provided with a roller follower 20 which engages in groove 16. Furthermore, an actuating rod 21 is articulated to the free end of pivot lever 19 to be pivotable about axis 22. This actuating rod 21 has its other end articulated at a lever 23 to be pivotable about axis 24. Lever 23 is in turn pivotable about a fixed axis 10. A frame structure which is generally indicated as 25 is also fastened to lever 23 and is connected to support slide plate 6.

Groove 16 in control cam disc 12 is composed of a spiral-shaped portion 16a extending over approximately 180° and a succeeding semicircular portion 16b extending over a further 180° and concentric to axis 13. If cam 12 is caused to rotate with the aid of drive motor 11 in the direction of arrow 26, follower 20 will initially travel in the spiral section 16a so that follower 20 and actuating rod 21 undergo a movement in the direction of arrow 27. This movement causes lever 23 to pivot about axis 10 in a clockwise direction with respect to the view of FIG. 1, producing a swinging movement of slide plate 6.

The pitch of the spiral groove portion 16a and the lengths of levers 19 and 23 are selected so that the slide plate 6 when so moved by lever 23 undergoes a swinging movement from the valve opening position shown in FIG. 1 into the valve closing position in which plate 6 is concentric to surface 8.

During further rotation of cam 12 about axis 13 in the direction of arrow 26 follower 20 rides in the concentric groove section 16b which does not change the radial position of follower 20 with respect to axis 13 so that no further pivoting movement of slide plate 6 is produced.

Generation of a sealing force which presses slide plate 6, and particularly seal 7, against the sealing surface 8, is controlled by groove 17 on side 15 of control cam disc 12, shown in FIG. 2. A roller follower 28 which is fastened to a pivot lever 29 engages in this groove 17. This pivot lever 29 is connected at one end to valve housing 1 to pivot about a fixed axis 30. An actuating rod 31 is articulated to the other end of lever 29 to be pivotable about an axis 32. The other end of actuating rod 31 is articulated to a lever 33 to be pivotable about an axis 34 as shown in FIG. 3. The other end of this lever 33 is connected with an accentric 35 which, upon movement of the actuating rod 31 causes a tie rod 36 to undergo a linear movement parallel to its axis.

Eccentric 35 is mounted to pivot with rod 33 about an eccentric axis 35' fixed to the valve housing. The eccentric also has a centrally located shaft pivotally supporting connecting piece 35" to which rod 36 is secured.

This linear movement of tie rod 36 serves to generate the required sealing movement and force. For this purpose tie rod 36 is connected to a central carrier, or tongue, 38, forming part of frame 25, to be pivotal about an axis 37 carried by tongue 38. Slide plate 6 is pivotally mounted on this tongue by means of a bearing shaft 39 and a bearing segment 40. Additionally a ball socket 42 is provided which is fastened to plate 6 and mounted in a clamping ring 43. The center of the ball socket 42 and thus the fulcrum of slide plate 6 lie in the sealing plane. This structure assures optimum uniform pressure distribution on seal 7.

The attachment of the plate 6 to the tongue 38 is effected with the help of webs 41 (compare also FIG. 1), which are affixed to the clamping ring 43 by means of screws 41'. The bearing shaft 39 passes through the tabs 41 as well as through the tongue 38. The opening 39' for the shaft 39 which is provided in the tongue 38 is configured as an oblong hole, so that limited play is possible in a plane that is at right angles to the plane of plate 6. In FIG. 3, the tongues 41 are shown in dashed lines, the axes of the screws 41' in dot-dash lines.

The end of tongue 38 opposite the pivot axis 37 is provided with a pressure surface 44 which has associated with it, in the closed position of slide plate 6, the counterpressure surface 45 secured in housing 1. Additionally, wheels 46 and 47, as shown in FIG. 1, are mounted at this end of the frame structure 25 to roll on a rail (not shown in detail) during the pendulum-like movement of the frame structure 25 and slide plate 6 so that the loading on the pendulum bearing in the area of axis 10 is reduced, if, during the pendular movements, transverse forces are exerted on the plate 6. These can, for example, be brought about by flowing media or they are present if the pendulum slide is not mounted in vertical position.

The frame structure 25 is stabilized by clamping screws 48 which also permit the amount of play in the bearing elements provided for slide plate 6 to be set. For this purpose, the screws 48 have counternuts 49, with the help of which the spacing of the outer carrier of the frame structure 25 can be adjusted.

The contact force for slide plate 6 against the sealing surface 8 is generated as follows:

As already mentioned in connection with the description of the pendulum-like movement, cam 12 is rotated in the direction of arrow 26 of FIG. 1 to close the above-described oscillating slide valve. The corresponding sense of rotation is shown in FIG. 2 by arrow 52. Groove 17 also has two portions 17a and 17b of which portion 17a is semicircular and concentric to axis of rotation 13 and portion 17b has the form of a spiral directed inwardly toward axis of rotation 13. Each portion 17a and 17b has an angular extent of approximately 180°.

During rotation of cam 12 through the first 180°, the radial position of the follower 28 engaging in groove 17 does not change. Pivot lever 29 thus also remains in the rest position. This is the phase during which slide plate 6 is moved from its valve opening position into its valve closing position. Thus, during this first section of rotation there is only a pivotal movement of lever 19 and no pivotal movement of lever 29.

In the second phase of the rotary movement of cam 12, only lever 29 undergoes a pivoting movement while lever 19 is at rest. This produces a movement of actuating rod 31 in the direction of arrow 53, which results in a linear movement of tie rod 36 in the direction of arrow 54. During this movement, pressure surface 44 comes to rest on counterpressure surface 45 so that tongue 38 is able to exert a uniform pressure on slide plate 6 via bearing shaft 39 and the ball socket 42.

The pitch of the spiral groove section 17b, the lengths of levers 29 and 33, the dimensions of eccentric 35 and the length of tongue 38 are selected so that upon completion of rotation of cam 12 the required sealing pressure has been produced.

The above-described oscillating slide valve is opened by rotating cam 12 in the direction opposite to arrows 26 and 52. This initially results in movement of actuating rod 31 and tie rod 36 in the directions opposite to arrows 53 and 54. During this movement, slide plate 6 is lifted off from sealing surface 8. Then actuating rod 21 moves in the direction opposite to arrow 27 so that slide plate 6 is brought from its valve closing position to its valve opening position.

During the pendulum-like movement of slide plate 6, tie rod 36 does not rotate along therewith. It is therefore connected to tongue 38 via a pivot bearing 55. Moreover, the tie rod 36 is sealed against the atmosphere by means of a bellows 56 so that the illustrated embodiment can also be used for vacuum applications.

Advisably, a coupling 57 is provided between drive motor 11 and cam 12 which is rotatably about axis 13, the coupling preferably being designed as an overload coupling, or a slip clutch.

It will be understood that the above description of the present invention is susceptible to various modifications, changes and adaptations, and the same are intended to be comprehended within the meaning and range of equivalents of the appended claims.

What is claimed is:

1. In an oscillating slide valve including a slide plate, a drive device for operating the slide plate, means defining a fluid flow passage and presenting a planar sealing surface surrounding the passage, a first mechanism connected between the drive device and the slide plate for moving the slide plate, in response to movement of the drive device, between a valve opening position in which the slide plate is displaced laterally from the fluid passage and a valve closing position in which the slide plate is interposed in the flow passage, and means for pressing the slide plate against the sealing surface when the plate is in its closing position, the improvement wherein: said means are connected to be driven by said drive device and comprise a second mechanism connected for moving said slide plate perpendicular to said sealing surface and against said sealing surface only after said slide plate has come to rest in said closing position; said drive device comprises a single drive motor and two control elements each connected to be driven by said motor and each presenting a circular control portion and a spiral control portion; and each said mechanism comprises a respective lever operatively associated with, and positively guided by, the control portions of a respective one of said control elements.

2. An arrangement as defined in claim 1 wherein said drive device comprises a control cam disc connected to be rotated by said drive motor and provided on each of its sides with a respective control groove, constituting a respective one of said control elements, and each said mechanism comprises a respective cam follower operatively associated with a respective one of said grooves and connected to a respective one of said levers.

3. An arrangement as defined in claim 2 wherein said first mechanism further comprises a frame structure supporting said slide plate and pivotable about a first stationary axis for moving said slide plate along a circular arcuate path between the opening and closing positions.

4. An arrangement as defined in claim 3 wherein said first mechanism further comprises a first actuating rod connected between said lever of said first mechanism and said frame structure for pivoting said frame structure in response to movement imparted to said cam follower associated with said first mechanism by rotation of said cam disc.

5. An arrangement as defined in claim 4 wherein said frame structure comprises a further lever pivotable about said first stationary axis and to which said first rod is pivotally connected.

6. An arrangement as defined in claim 3 wherein said frame structure further comprises a ball socket supporting said slide plate and having a center lying in that surface of said slide plate which coincides with said sealing surface when said slide plate is pressed against said sealing surface.

7. An arrangement as defined in claim 2 wherein said second mechanism further comprises a second actuating rod having one end connected to said lever of said second mechanism, said second mechanism being arranged for pressing said slide plate against said sealing surface in response to movement imparted to said cam follower associated with said second mechanism by rotation of said cam disc.

8. An arrangement as defined in claim 7 wherein said second mechanism further comprises an eccentric member connected to the other end of said second actuating rod to be rotated by movement of said second actuating rod, and a tie rod connected between said eccentric member and said slide plate, said tie rod being arranged to undergo a linear movement along its axis in response to rotation of said eccentric member and being connected to said slide plate for causing said slide plate to be pressed against said sealing surface in response to such linear movement of said tie rod.

9. An arrangement as defined in claim 8 wherein said frame structure comprises a central support member supporting said slide plate and connected to the remainder of said frame structure for movement as a unit therewith along the arcuate path between the opening and closing positions and for movement relative to the remainder of said frame structure in the direction perpendicular to said sealing surface, said tie rod is connected to one end of said central support member, the other end of said central support member is provided with a bearing surface, and said arrangement further comprises means defining a stationary counter surface located to face said bearing surface when said slide plate is in its said closing position and to be contacted by said bearing surface as said slide plate is moved against said sealing surface.

10. An arrangement as defined in claim 2 wherein the circular control portion of each said groove is concentric to the axis of rotation of said cam disc, said circular and spiral portions of each said groove are contiguous with one another and follow one another around the periphery of said cam disc, each said portion subtends an angle of approximately 180° about the axis of rotation of said cam disc, and said spiral control portion of each said groove is located opposite said concentric portion of the other said groove, in the direction parallel to the axis of rotation of said cam disc, and further wherein both fo said cam followers are disposed to the same side of the axis of rotation of said cam disc.

11. An arrangement as defined in claim 2 wherein said first mechanism further comprises a frame structure supporting said slide plate and pivotable about a first stationary axis for moving said slide plate along a circular arcuate path between the opening and closing positions, and guide rollers carried by said frame structure at the end thereof remote from said first stationary axis for guiding said frame member during its pivotal movement about said first axis.

12. An arrangement as defined in claim 1 wherein each of said control elements is constituted by a rotatable cam element presenting cam surface portions defining said circular and spiral control portions, each said mechanism comprises a cam follower connected to a respective one of said levers and positively guided by the cam surface portions of a respective one of said cam elements, and each said circular control portion is concentric to the axis of rotation of its respective cam element.

* * * * *